though a boss 58 having appropriate bearings (not
United States Patent Office 3,263,756
Patented August 2, 1966

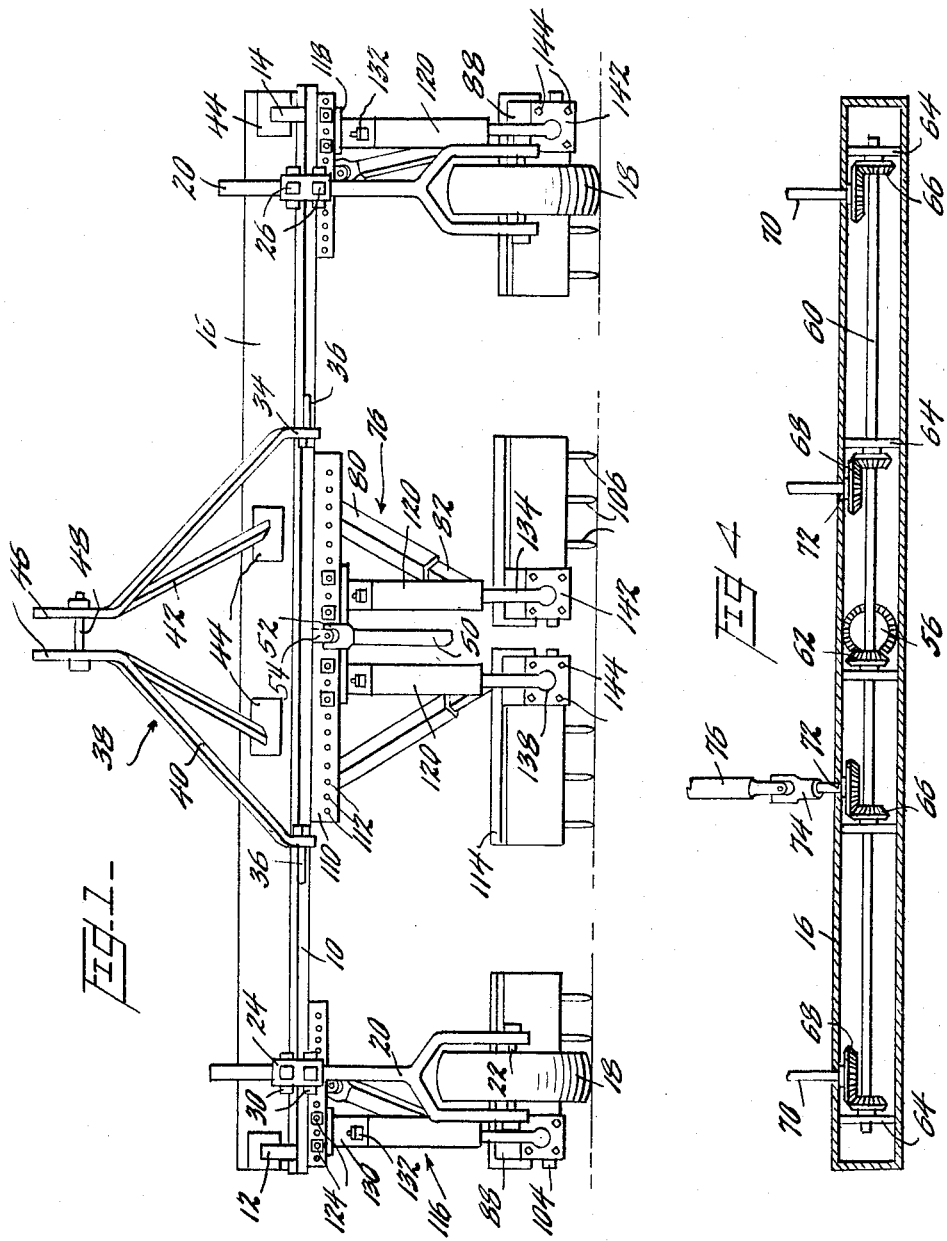

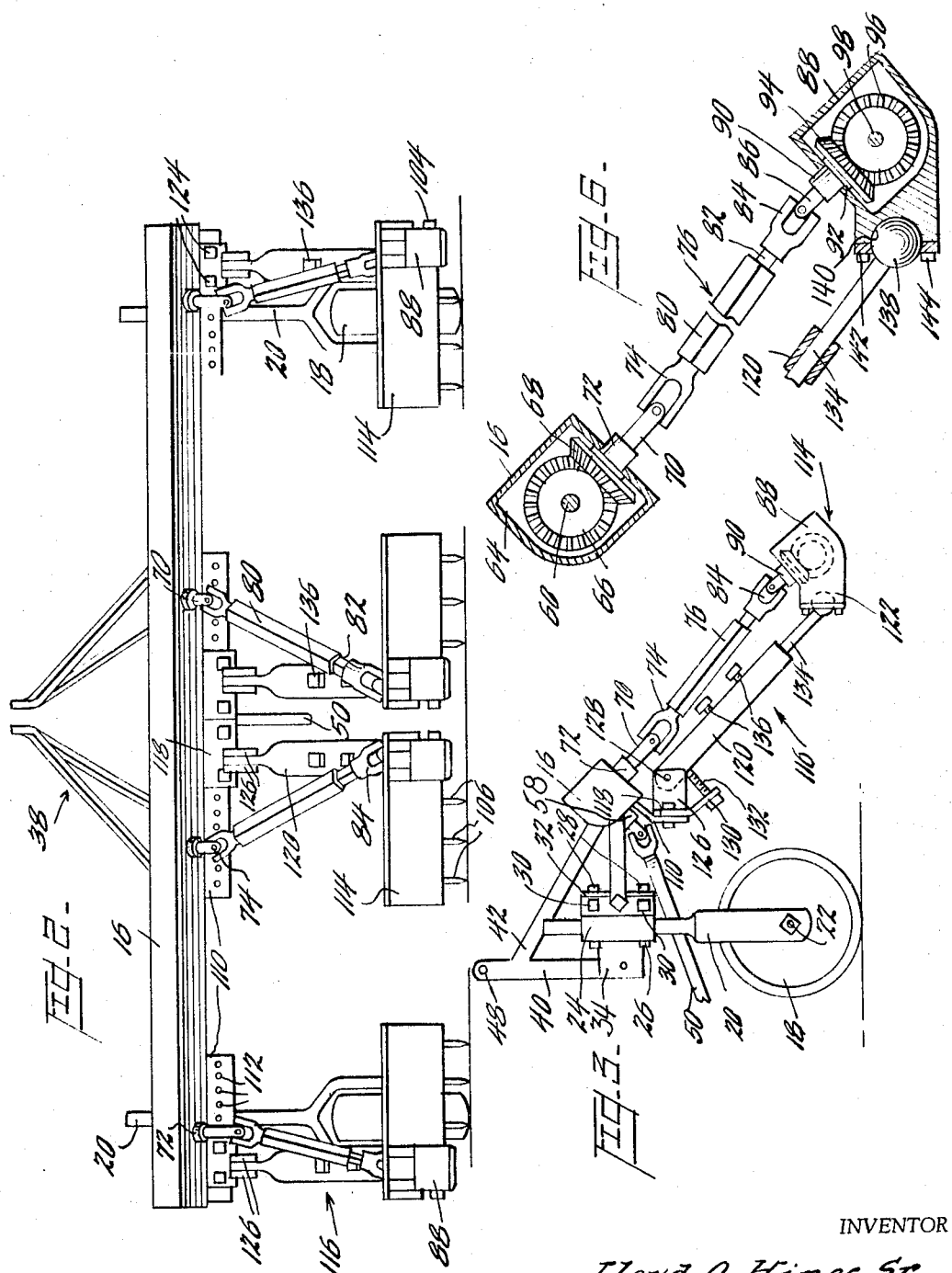

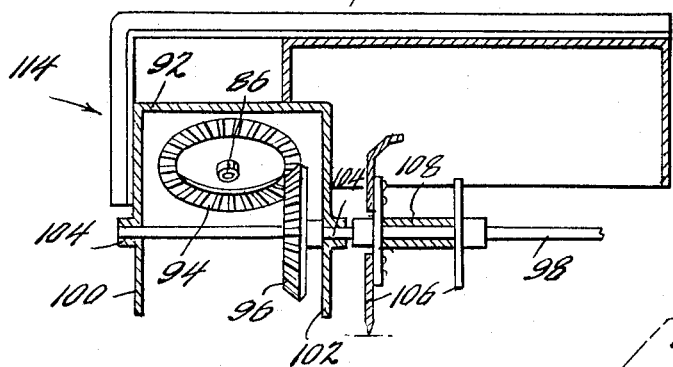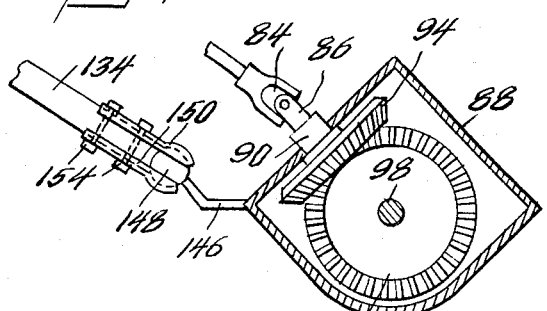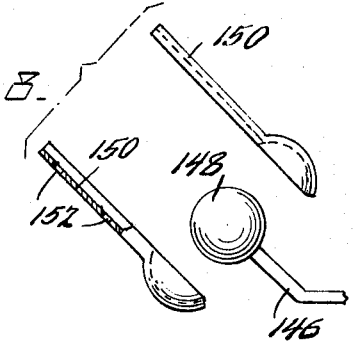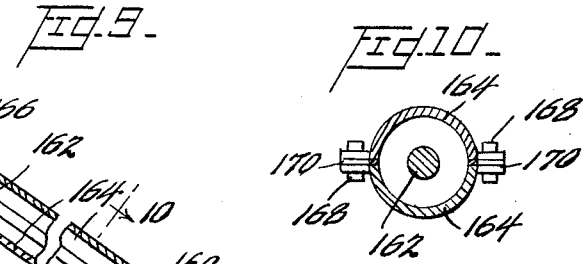

3,263,756
ROTARY TILLING DEVICE
Lloyd Q. Hines, Sr., P.O. Box 1098, Suffolk, Va.
Filed Aug. 24, 1964, Ser. No. 391,509
12 Claims. (Cl. 172—60)

This invention relates to a rotary tilling device. More particularly, this invention concerns a tilling implement having positively driven rotary elements thereon adapted for a variety of applications in the art of soil cultivation. The entire invention is intended for attachment to the rear of a tractor of the type equipped with an hydraulic system together with a rotary power take-off device for actuating said invention. Such tractors are available and widely used today; one well-known type is the Ford-Ferguson system tractor.

Coincident with the increased availability of the above type tractor has come a variety of power driven farm implements. Substantial improvements have been realized in the art of cultivating growing crops planted in rows. Today, a variety of power-driven rotary-toothed cultivators have been developed, these cultivators possessing distinct advantages over older cultivators having fixed ground engaging implements attached thereto, since the improved type of cultivators takes advantage of the newer, more powerful tractors which allow high speed cultivation. Two of the more significant developments in the art may be found in U.S. Patents Nos. 3,066,743 and 3,125,166. These prior patents, both issued to me, disclose first, a high speed rotary cultivating device having power take-off means attached thereto, and secondly, a specific rotary tilling implement adapted to meet varying ground conditions.

The prior art as above discussed includes a power driven rotary tilling device having a horizontal drive shaft therein adapted to be drawn at right angles to the rows of growing crops that are to be cultivated. A plurality of rotary tilling implements are arranged along the shaft; these are adjustably securable thereto dependent upon soil conditions and the width of the rows of crops to be cultivated. These devices also include a suitable arm extension attached to the frame of the device, said arm being attached to the hydraulic apparatus of a tractor for lifting the shaft and cultivating implements out of contact with the soil.

The instant invention represents a substantial improvement in the art of power cultivators, as it provides a plurality of power driven shafts, each having a further plurality of rotary tilling implements thereon for soil and crop cultivation. The invention includes a rotary drive shaft arranged horizontally and adapted to be drawn at right angles to the rows of growing crops. A suitable positioning is provided for said drive shaft, and attached thereto are a plurality of power take-off means, each said means including a second rotary drive shaft having tilling implements mounted thereon. These latter drive shafts are adapted for horizontal, vertical, and axial adjustment with respect to said first drive shaft, so that each individual implement unit may be adjusted to meet the conditions of the row of crops that it is cultivating.

A fuller understanding of the novel features of this invention may be had by reference to the following specification, claims, and drawings, in which:

FIG. 1 is a front elevational view of the entire invention;

FIG. 2 is a rear elevational view of the device;

FIG. 3 is a side elevational view of the invention as shown in FIG. 1;

FIG. 4 is a horizontal sectional view of the primary drive shaft of the invention together with appendant casing and power take-off means;

FIG. 5 is a sectional view, drawn to an enlarged scale, of one of the secondary drive shafts, together with appendant casing, gearbox, and tilling implement;

FIG. 6 is an enlarged, partial, sectional view taken from the right hand portion of FIG. 3;

FIG. 7 is another enlarged, partial, sectional view, similar to the lower half of FIG. 6, but showing another embodiment of the invention;

FIG. 8 is an enlarged, partial, exploded view of the left hand portion of FIG. 7;

FIG. 9 is an enlarged, partial, sectional view, similar to FIG. 6, but showing yet another embodiment of the invention;

FIG. 10 is an enlarged, sectional view taken along lines 10—10 of FIG. 9.

Referring now to the drawings by reference character, and in particular to FIGS. 1 through 4 thereof, numeral 10 refers to a forward diamond bar which is secured to a casing support 16 by a pair of box bar members 12 and 14. These four members, when viewed from above, have the general appearance of a rectangle; thus said members serve as the basic, integral frame structure of the invention. Additionally, these members are preferably joined together by welding, although obviously other methods of joining may be used. A pair of dolly wheels 18 are used to support the framework just described above the ground.

Each dolly wheel 18 is mounted in the lower end of a forked post unit 20 having an axle 22 therein for carrying wheel 18. Post 20 is secured to diamond bar 10 by a bracket member 24 having bolts 26 therein which permit vertical adjustment of post 20 with respect to diamond bar 10. T-fittings 30, mounted in the rearward portion of bracket 24 have stem portions extending through a plate member 32, placed rearwardly of diamond bar 10 and adjustably secured thereto by nuts 28 fitted on said stem portions of T-fittings 30. This arrangement permits longitudinal adjustment of post 20 with respect to diamond bar 10.

A pair of draft plates 34 may be secured to diamond bar 10 as by welding, and carry coupling pins 36 therein. An hydraulic draft hitch assembly 38 comprises support bars 40, secured to draft plates 34 by coupling pins 36, and an additional pair of support bars 42, welded to casing support 16. Stock plates 44 are placed at the weld points of bars 12, 14 and 42 to assure structural integrity of the entire device. The upper coincident ends of bars 40 and 42 are joined together as by welding to form a pair of upstanding ears 46 which are joined together by a pivot bar 48. Pivot bar 48 is secured to the hydraulic rod of the hydraulic lift of the tractor (not shown) thereby permitting the rear of the implement frame to be pivoted upwardly about axles 22 of the dolly wheels 18. This arrangement permits the ground contacting members of the invention to clear the ground when the device reaches the end of a row and is turned around.

The mechanical power take-off means of the tractor (not shown) is attached to the device through a drive shaft 50, universal joint 52, input shaft 54, and bevel gear 56. Input shaft 54 enters the wall of casing 16 through a boss 58 having appropriate bearings (not shown). Referring now to FIG. 4 in particular, there is shown a power shaft 60 arranged longitudinally within casing support 16 and receiving power from the tractor through bevel gear 56 which is meshed with another bevel gear 62 mounted on power shaft 60. Power shaft 60 is secured within casing support 16 by means of a number of bearing plates 64 mounted transversely therein. Additional bevel gears 66 are mounted on power shaft 60, adjacent bearing plates 64, and have additional bevel gears 68 meshed therewith which serve as secondary power take-off means for the rotary tilling implements to be described below. Output shafts 70 are mounted concentrically with bevel gears 68, extend rearwardly through casing support 16, and are secured for rotation through the casing wall by means of additional bosses 72 having appropriate bearings therein. The power train continues through additional universal joints 74 to secondary drive shafts 76.

Turning now to FIGS. 3, 5, and 6, the remaining portions of the power train will be described. FIGS. 5 and 6 are detail views showing one of the four power driven cultivator implements shown in FIGS. 1 and 2. Secondary drive shaft 76 includes two interfitting box tube members 80 and 82 which permit longitudinal extension and contraction of said drive shaft when such is required as will be explained below. Drive shaft member 82 is equipped with a universal joint at the lower end thereof, designated by numeral 84. A secondary input shaft 86 is secured at the lower end of universal joint 84 to supply power to gearbox 88 through boss 90 mounted in wall 92 of gearbox 88. Boss 90 is equipped with suitable bearings to afford rotation of input shaft 86 therein. A bevel gear 94 is mounted on the lower end of input shaft 86 and is meshed with an additional bevel gear 96, arranged at right angles thereto within gearbox 88, bevel gear 96 being secured to a secondary power shaft 98 which is rotatably secured in side walls 100, 102 of gearbox 88 by hubs 104 having suitable bearings therein. Power shaft 98 extends through wall 102 of gearbox 88 and is further equipped with rotary cultivating implements 106. Rotary implements 106 may be spaced apart by a number of suitable sleeves 108, mounted on power shaft 98. Rotary implements 106 may be of the type which are described in my prior Patents Nos. 3,066,743 or 3,125,166. The invention has been devised to employ these types of rotary cultivating implement but other varieties may be used dependent upon the type of cultivating to be done.

It can be seen from the foregoing that the general embodiment of this invention is a rotary tilling device having a primary power shaft incorporated therein, said shaft arranged at right angles to the direction of implement travel, and a plurality of individual, power driven, earth working implements, secured rearwardly of the primary power shaft. Each individual earth working implement is equipped with its own secondary power shaft, and is additionally provided with separate support means which will now be discussed: FIGS. 1 and 2 show a series of support brackets 110 depending downwardly from support casing 16. Each support bracket 110 has a plurality of bores 112 therein for selective attachment of the individual tilling element, designated by numeral 114. The support structure for each individual tilling element 114, designated by numeral 116, comprises a mounting plate 118, adjustable support arm 120, and lower mounting unit 122. Mounting plate 118 is selectively secured to bracket 110 by means of bolts 124. A pair of ears 126 extend rearwardly from mounting plate 118 to receive the upper end of support arm 120, vertically pivotally mounted therebetween by means of a pivot pin 128. Mounting plate 118 is also provided with a downwardly depending suspension plate 130 having an adjustment screw 132 threadably received therein. Screw 132 is used to determine the vertical displacement of tilling implement 114 with respect to the ground. The lower end of support arm 120 is in the form of a hollow tube to receive an extension shaft 134. Shaft 134 is maintained in proper position by a pair of adjusting screws 136 mounted through support arm 120. The lower end of shaft 134 is in the form of a ball 138 which is fitted into a coincident semispherical chamber 140 located on one face of mounting unit 122 which is formed as an extension of implement gearbox 88. Ball 138 is maintained within chamber 140, and is adjustable therein, by means of an inwardly tapered mounting plate 142 secured to the face of mounting unit 122 by a number of screws 144.

Two additional embodiments of support 116 are shown in FIGS. 7 through 10 of the drawings. The first additional embodiment to be described involves an alternative method of securing support arm 120 to cultivating element 114, and is shown in FIGS. 7 and 8. In this instance, the lower end of shaft 134 is formed without ball 138. In place of mounting unit 122, there is instead a support arm extension 146, formed on the forward end of gearbox 88, said arm having a ball 148 mounted at the upper end thereof. Ball 148 is secured to shaft 134 by a pair of spoons 150 having bores 152 through the handle portions thereof. A pair of adjustable bolts 154 are mounted through bores 152, and through coincident bores 156 in shaft 134.

FIGS. 9 and 10 show yet another embodiment of the invention wherein the secondary drive shaft and the implement support unit 116 are combined together as concentrically mounted units. The object here is to reduce the number of adjustments required to locate element 114 properly with respect to support casing 16. In this instance, bosses 72 and 90 are equipped with spherically shaped ring elements 158 and 160 respectively, welded at the outer perimeter thereof. The extensible secondary drive shaft 76 described above is replaced with a single drive shaft 162. A pair of semi-cylindrical coupling support members 164 are mounted exteriorly of and concentrically with drive shaft 162, and are equipped with cups 166 at either end thereof, said cups mating with the exterior surface of rings 158 and 160. Semi-cylindrical members 164 are secured by bolts 168 mounted through coincident pairs of ears 170 which are mounted along and extend outwardly from the mating portions of semi-cylindrical members 164.

Therefore I am not to be limited strictly to the exact construction disclosed herein, except as limited by the appended claims.

I claim:

1. A tilling device for cultivating crops grown in rows comprising a framework having ground contacting means for movement of said device over said crops, a central drive shaft arranged at right angles to the path of travel of said device, a plurality of elongated power take-off shafts located along said central drive shaft, and operatively connected thereto rearwardly thereof, and a corresponding plurality of rotary driven tilling implements, one each operatively connected to a respective power take-off shaft, first means adjacent said drive shaft for selectively directing each of said power take-off shafts radially and angularly with respect to the axis of said drive shaft, and second means adjacent the remote portion of said power take-off shafts for selectively directing each of said plurality of rotary driven tilling implements radially and angularly with respect to the axis of the corresponding power take-off shaft, said first and second means for selective direction being independently operable.

2. The device of claim 1 wherein said framework includes a generally rectangular horizontal association of support elements, said ground contacting means mounted on the forward portion of said framework and adjustable therewith, vertically and horizontally, the rear element of said association of support elements being in the form of a generally cylindrical casing, said drive shaft located within said casing and rotatable therein.

3. The device of claim 2 wherein said casing is provided with a plurality of transverse support elements for said drive shaft, a plurality of gear means, each adjacent a corresponding member of said support elements, for translating rotary movement of said drive shaft approximately at right angles with respect to said drive shaft, and a plurality of output shafts, each associated with one of said plurality of gear means, extending rearwardly through said casing.

4. The device of claim 3 wherein each said rotary driven tilling element includes a gear box having an input shaft for receiving and translating rotary motion therethrough, a secondary power shaft, extending from said gear box and located in generally parallel relationship with respect to the ground, and a plurality of tilling implements arranged along said secondary power shaft and adapted for ground contact, one of said power take-off shafts being mounted on one of said output shafts and operatively connected to said input shaft.

5. The device of claim 4 wherein said one of said power take-off shafts is connected at one end to said output shaft by a plurality of universal joints.

6. The device of claim 5 wherein said one of said power take-off shafts is arranged for longitudinal adjustment.

7. The device of claim 4, wherein said first selective directing means includes a support bracket arranged along said casing, and a support arm selectively securable to said support bracket and said gear box.

8. The device of claim 7 wherein said support arm includes two, slidably interfitting members for longitudinal adjustment of said arm, the first of said members having adjustable connective means cooperating with said support bracket, said second member having one of said second selective directing means thereon comprising means for pivoted connection with said gear box.

9. The device of claim 8 wherein said means for pivotal connection includes a ball, mounted on said second member, a socket, mounted in said gear box, and a removable plate, clampingly engaging said ball in said socket.

10. The device of claim 8 wherein said means for pivotal connection includes a shaft, rigidly secured to said gear box, a ball, rigidly secured to said shaft, and a pair of spoons having handles removably secured to said second member, said handles having cups thereon adapted for clamping engagement with said ball.

11. The device of claim 4 wherein said input, output, and power take-off shafts are located concentrically within said first selective directing means and said second selective directing means.

12. The device of claim 11 wherein said first selective directing means and said second selective directing means comprise a pair of support rings, each located adjacent to and about said input and output shafts, and a pair of channel members having cup-like members at either end thereof, adjacent cup-like members securable to one of said pair of support rings, said pair of channels removably securable, one to the other, concentrically about said one of said power take-off shafts.

References Cited by the Examiner

UNITED STATES PATENTS

| | | | |
|---|---|---|---|
| 973,677 | 10/1910 | Lynch | 172—122 X |
| 2,176,261 | 10/1939 | Kelsey | 172—60 |
| 2,361,798 | 10/1944 | Smith | 172—60 |
| 2,537,586 | 1/1951 | Huitema | 172—120 X |
| 2,681,607 | 6/1954 | Glover | 172—60 |
| 3,125,166 | 3/1964 | Hines | 172—120 |

FOREIGN PATENTS 1,102,298  5/1955  France.

ABRAHAM G. STONE, *Primary Examiner.*

R. L. HOLLISTER, *Assistant Examiner.*